United States Patent [19]

Sharp

[11] Patent Number: 5,052,216
[45] Date of Patent: * Oct. 1, 1991

[54] CONTAINMENT MEANS FOR STORAGE TANK SYSTEMS

[76] Inventor: Bruce R. Sharp, 7685 Fields-Ertel Rd., Cincinnati, Ohio 45241

[ * ] Notice: The portion of the term of this patent subsequent to Oct. 1, 2008 has been disclaimed.

[21] Appl. No.: 504,124

[22] Filed: Apr. 3, 1990

Related U.S. Application Data

[63] Continuation-in-part of Ser. No. 281,816, Dec. 8, 1988, Pat. No. 4,912,966, which is a continuation-in-part of Ser. No. 66,691, Jun. 26, 1987, abandoned, which is a continuation-in-part of Ser. No. 820,027, Jan. 21, 1986, Pat. No. 4,685,327, which is a continuation-in-part of Ser. No. 740,869, Jun. 3, 1985, Pat. No. 4,607,522, which is a continuation-in-part of Ser. No. 544,013, Oct. 21, 1983, Pat. No. 4,523,454, and a continuation-in-part of Ser. No. 580,800, Feb. 16, 1984, Pat. No. 4,524,609, which is a continuation-in-part of Ser. No. 544,012, Oct. 21, 1983, abandoned, and a continuation-in-part of Ser. No. 745,540, Jun. 17, 1985, abandoned.

[51] Int. Cl.$^5$ ............................................... G01M 3/32
[52] U.S. Cl. ..................................... 73/49.2; 220/1 B; 220/85 S
[58] Field of Search ................... 73/49.2; 220/DIG. 5, 220/85 S, 85 VR, 85 VS, 1 B, 18, 5 A

[56] References Cited

U.S. PATENT DOCUMENTS

| | | | |
|---|---|---|---|
| 1,156,469 | 10/1915 | Dodge | 220/85 S |
| 4,527,708 | 7/1985 | Dundas et al. | 220/85 S X |
| 4,637,522 | 1/1987 | Klop | 220/85 VR X |
| 4,639,164 | 1/1987 | Pugnale et al. | 220/1 B X |
| 4,653,312 | 3/1987 | Sharp | 73/49.2 |
| 4,655,361 | 4/1987 | Clover et al. | 220/18 X |
| 4,685,327 | 8/1987 | Sharp | 73/49.2 |
| 4,685,585 | 8/1987 | Robbins | 220/5 A X |
| 4,717,036 | 1/1988 | Dundas et al. | 220/85 S X |
| 4,884,709 | 12/1989 | McCarthy | 220/1 B X |
| 4,895,272 | 1/1990 | DeBenedittis et al. | 220/85 S |

FOREIGN PATENT DOCUMENTS

| | | | |
|---|---|---|---|
| 755751 | 2/1971 | Belgium | 220/85 S |
| 763788 | 8/1971 | Belgium | 220/85 S |
| 2900960 | 7/1969 | Fed. Rep. of Germany | 73/49.2 |
| 1548526 | 10/1968 | France | 73/49.2 |
| 565999 | 8/1975 | Switzerland | 73/49.2 |

*Primary Examiner*—Hezron E. Williams
*Assistant Examiner*—Joseph W. Roskos
*Attorney, Agent, or Firm*—Charles R. Wilson

[57] ABSTRACT

A storage tank system especially useful for storing liquid gasoline comprises a rigid inner storage tank, access lines extending through the tank, a sleeve encompassing the access lines, a jacket encasing the tank and at least part of the sleeve, and a drip sump compartment positioned on a sleeve cover to the sleeve to catch drippings from a fill operation. A leak detector is associated with the closed space between the inner tank and jacket to detect leaks. The system results in a storage facility which is not likely to lose its stored liquid to the environment due to slow leak or a sudden large leak by providing total containment capability.

23 Claims, 3 Drawing Sheets

CONTAINMENT MEANS FOR STORAGE TANK SYSTEMS

This application is a continuation-in-part of "Total Containment Means for Storage Tank Systems", Ser. No. 07/281,816, filed Dec. 8, 1988, now U.S. Pat. No. 4,912,966, which is a continuation-in-part of "Total Containment And Overfill Storage Tank System", Ser. No. 07/066,691, filed June 26, 1987, now abandoned, which is a continuation-in-part of "Total Containment Storage Tank System", Ser. No. 820,027, filed Jan. 21, 1986 now U.S. Pat. No. 4,685,327, which is a continuation-in-part of "Storage Tanks Having Secondary Containment Means", Ser. No. 06/740,869, filed June 3, 1985, now U.S. Pat. No. 4,607,522, which is a continuation-in-part of "External Jacket System As Secondary Containment For Storage Tanks", Ser. No. 544,013, filed Oct. 21, 1983, now U.S. Pat. No. 4,523,454 and "Storage Tank Systems", Ser. No. 06/580,800, filed Feb. 16, 1984, now U.S. Pat. No. 4,524,609 which is a continuation-in-part of "Storage Tank Systems", Ser. No. 06/544,012, filed Oct. 21, 1983, now abandoned and a continuation-in-part of "Fiberglass Reinforced Resin Storage Tanks With Secondary Containment Means", Ser. No. 06/745,540, filed June 17, 1985, now abandoned.

This invention relates to liquid storage tank systems. More particularly, the invention relates to double walled storage tank systems having total leak prevention means.

BACKGROUND OF THE INVENTION

Storage tanks are widely used for storing a variety of liquids. Some of these liquids are hazardous and can be corrosive and/or flammable. In particular, underground storage tanks are used extensively for the storage of liquid gasoline at retail gasoline stations. The service life of a storage tank will vary, but eventually the tank and its piping will leak. Leaks from the tank system often happen within a few years after the new tank and piping are installed, due to improper insulation or flaws in the manufacturing of the tanks and piping.

Known leakage problems are particulary troublesome in that gasoline storage tanks are usually buried underground. Any leaks which develop are normally very slow initially and are very difficult to detect. Underground storage tanks are susceptible to damage in those area that are prone to earthquakes and winter frost heaves of the ground surrounding the tanks. Typical underground storage tanks are constructed with structural accessories such as a manhead, its lid, and piping for filling, dispensing, and venting. The accessories described are examples of structures which liquids and vapors flow through and all of which are normally located at the top of the tank. Leaks from subterranean tanks or the accessories can result in a significant danger to the environment and health of nearby residents. Federal as well as local regulations govern the design and maintenance of such storage tanks.

Heightened public awareness of the danger posed by underground storage tanks has led to additional governmental regulations. Recent proposed regulations will require most storage tanks to have secondary containment means and possibly a fail safe leak detection design feature to guard against accidental soil and water contamination. Secondary containment is accomplished by a jacket completely encasing the tank and structural accessories. The tank and related accessories are referred to as the primary containment system. Any jacket or wall encasing the primary system is often referred to as a secondary containment system.

Leak detection means are often utilized to monitor the space between the primary and secondary containment systems for leaks or failures. Leak detection devices such as probes or degrading monitoring cables which are utilized to detect gasoline, vapors or water can not detect the failure of the exterior jacket. When the underground jacket fails and there is no ground water present, probes or degrading monitoring cannot detect jacket failures. Probes and degrading monitors are examples of the type monitors that cannot provide a fail safe leak detection means.

The problem associated with inadequate detection means is that when the liquid stored within the primary containment system leaks, the liquid may also leak out of the secondary containment jacket which may have failed in prior years. Also a slow leak from the primary containment may never reach the location of a non fail safe detection device because the liquids leaked from the primary containment into the jacket could drain out of the defective jacket at a location away from the monitors. The best feature of a fail safe detecting means is the continuous monitoring method that establishes the system to be free of leaks, from the time the system is installed to the time the system is removed.

There now has been discovered a total secondary containment system capable of encasing the liquid storage underground tank and tank's structural accessories. The present invention solves the problems inherent with existing tank systems with provisions for leak detection means.

SUMMARY OF THE INVENTION

The present invention is concerned with liquid storage tank systems. The new system comprises (a) a rigid inner storage tank, (b) access lines extending through the storage tank to the interior of the tank, (c) a sleeve with cover attached to form a sleeve area through which the access lines pass, (d) a jacket encasing the storage tank and extending to the sleeve so that a closed space exists between the storage tank and jacket to contain any leakage, and (e) a drip sump compartment positioned on the cover of the sleeve. The sleeve is securely attached to either the jacket or the inner tank. Another aspect of the new system additionally has a leak detector means in communication with the closed spaces. Any leak which occurs in the storage tank is contained within the jacket and sleeve and is detected by the leak detector means.

DETAILED DESCRIPTION OF THE INVENTION

While the description which follows describes the invention in terms of its use with underground gasoline storage tanks, it should be understood the invention has applicability for other uses as well. For example, storage tanks used for storing liquids other than gasoline can utilize the present invention. However, the invention lends itself particularly well to underground tanks used for storing liquid gasoline and, therefore this preferred use is described in the following paragraphs.

Figure 1:
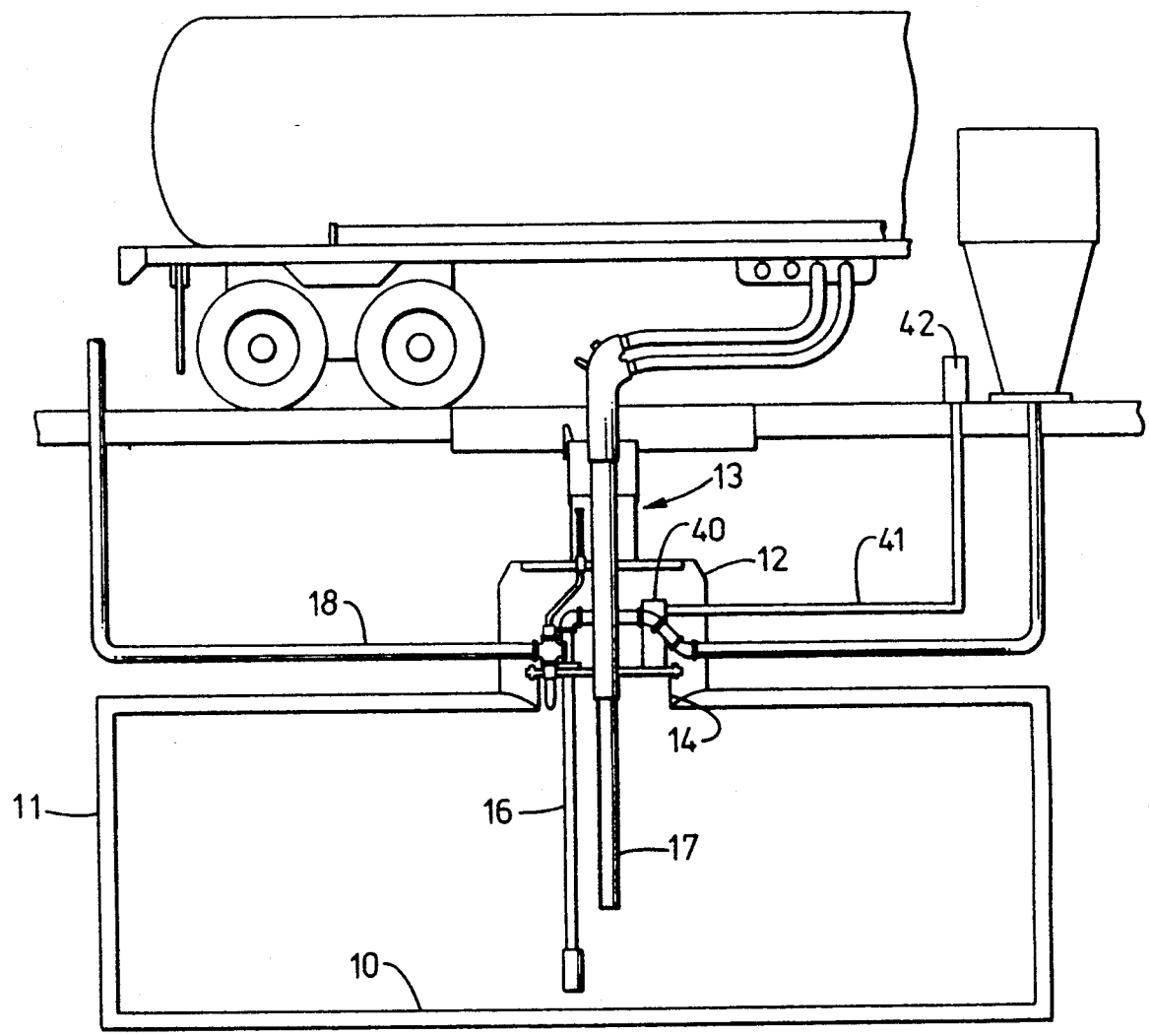
FIG. 1 is a schematic of the improved storage tank system of this invention.
Figure 2:
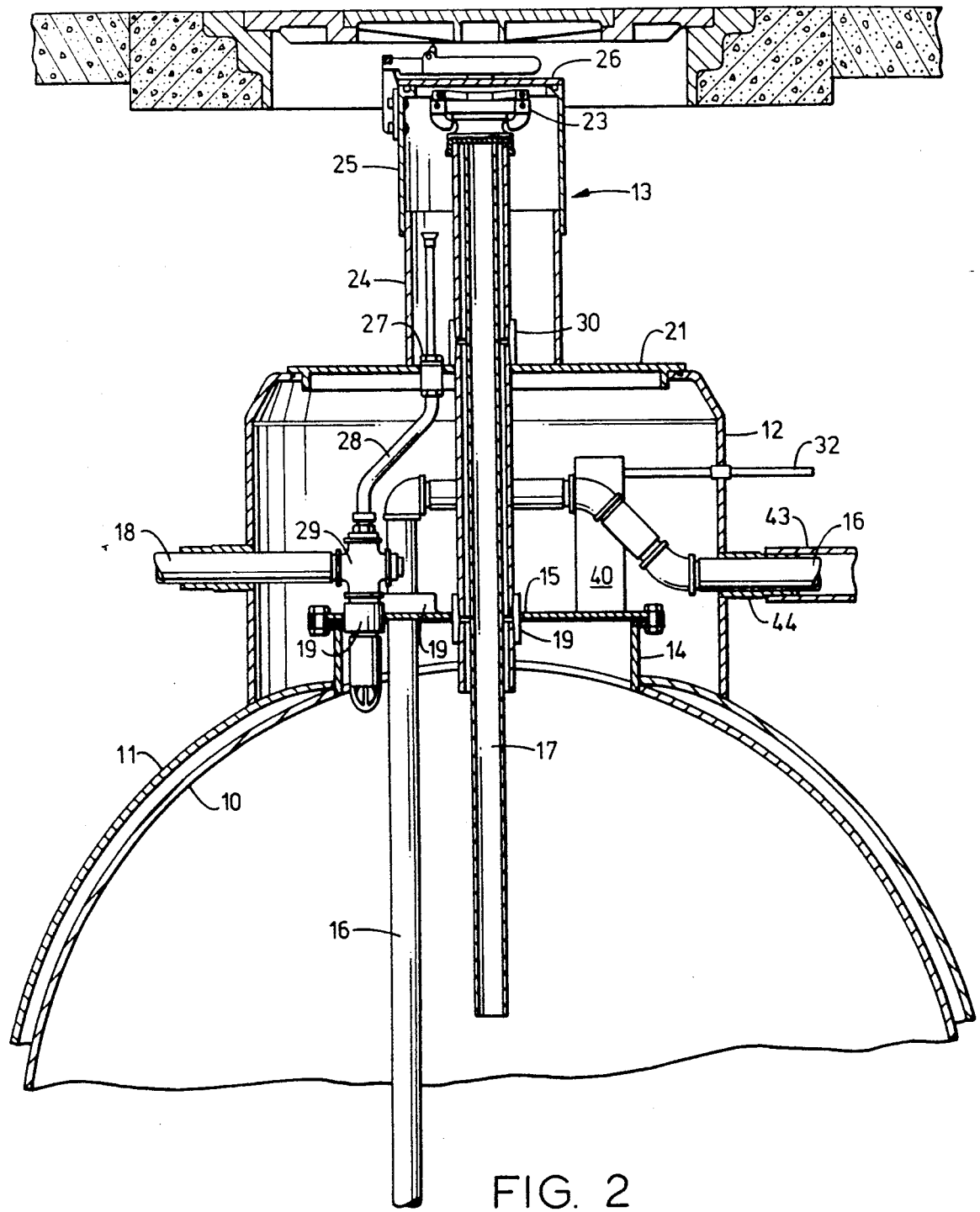
FIG. 2 is a cross-section view of the storage tank system of FIG. 1.

With reference to FIGS. 1 and 2, the present invention comprises a rigid inner storage tank 10, outer jacket 11, sleeve 12 and drip sump compartment 13. These figures illustrate that embodiment of the invention wherein the sleeve is securely attached directly to the jacket. The inner tank 10 is made of metal such as steel. The tank could as well be made of a fibrous reinforced resinous material e.g. a fiberglass reinforced polyester or vinylester material. As shown, though not required, a manhead 14 is securely attached to the storage tank. The manhead's primary function is to serve as a means by which access can be gained to the interior of the tank. Removal of a cover 15 positioned on the manhead 14 after disconnecting all access lines passing through the cover will allow an individual to enter the tank for repair or inspection purposes. As a secondary function, the manhead provides a means by which the various access lines enter the tank. The manhead is generally cylindrical in shape and about one to three feet in diameter, though other shapes and dimensions can be utilized. The cover 15 is securely fastened, preferably in liquid tight fashion by known attachment means, e.g. bolts and nuts. Such tanks are well known and are commonly used for storage of various liquids.

Passing through the manhead are various access lines typically associated with underground storage tanks. Thus, a dispensing line 16 leads to a ground level gasoline dispenser, a fill pipe 17 leads to a capped opening at or near the ground surface and a vent pipe 18 leads to the atmosphere. They are all secured to the manhead's cover by double threaded bushings 19. In that embodiment of the invention wherein the inner storage tank has no manhead, the aforementioned access lines are secured directly to the tank within the sleeve area.

The jacket 11 is constructed of a material of sufficient strength to contain the stored gasoline in case of a leak. The jacket can be made of a thin gauge steel or a synthetic polymeric material, including an elastomeric material such as rubber, e.g. Buta-N, neoprene, fluoroelastomer, e.g. Viton, polyester, vinyl esters, polyethylene (preferably a low density polyethylene), polypropylene, polyvinylchloride, polyurethane, polyepoxie and various fiber reinforced, fabric and vinyl backed sheets of any of the foregoing materials as well as materials constructed of two or more of the foregoing materials, e.g. fluoroelastomer coated polyethylene. Fiberglass reinforced polyesters and vinyl esters are two preferred jacket materials. The listed materials used in construction of the jacket are not all inclusive, but only illustrative of some of the materials that can be used. Preferably, the jacket is made of at least one material which is gasoline impervious.

The jacket is formed or added onto the inner storage tank by any convenient method. It can be built directly on the inner tank. That is, fibrous reinforcing material and resinous material can be applied separately or substantially simultaneously to the inner tank and hardened to form a self-sustaining jacket. A spacing material can be used to ensure the jacket does not adhere to the inner tank. There are other methods of installing the jacket.

The shape of the jacket 11 is such that it substantially encases the inner storage tank 10 to form a closed space between the jacket and the inner tank. The jacket is sized to hold up to 200% of the inner tank's contents. Preferably, the jacket 11 extends to the manhead and is secured thereto.

The sleeve 12 extends around and encloses manhead 14. The sleeve is preferably cylindrical in shape but can be other shapes as well and extends about twelve inches to about forty-eight inches above the inner tank 10. It is securely attached to the jacket 11. A sleeve cover 21 seals the sleeve's interior. Sleeve supports can be used to add additional support to the sleeve. The supports, in the form of brackets are welded to the tank 10 and the sleeve.

In effect, the jacket encases the inner tank to provide secondary containment of liquid contained within the primary containment means, i.e. the rigid inner storage tank. Similarly, sleeve 12 and sleeve cover 21 encases the manhead 14 to provide secondary containment of this accessory part of the inner tank. In effect, the jacket 11, sleeve 12 and sleeve cover 21 totally encase the inner tank 10 and its manhead 14.

A drip sump compartment 13 is provided around the upper fill pipe 17. Liquid capacity of the sump area within the compartment is approximately one to twenty-two gallons. The sump area is not intended to be utilized as an overfill device, but rather is used as an overfill drippings catcher. The problem with using the sump as a overfill capacity area is that it is not doubled walled, and lacking in capacity. The sump area is used to collect any drippings that may result from a lose connection and/or during disconnecting of a flexible delivery hose leading from the transport tank to the fill line adapter 23. The compartment's lower cylinder 24 is attached by preferably a water tight method to sleeve cover 21. Preferably, the lower cylinder 24 has an adjustable slide height upper cylinder 25 to move it near the under side surface of a conventionally used surface manhole cover. The preferred height of the lower and upper cylinders from the sleeve cover is one to three inches, but not exceeding sixteen inches. When the preferred height is adjusted to be in proper proximity to the surface manhole cover, cylinders 24 and 25 are sealed together. Sealing methods such as gluing, welding, or band clamping are various known methods. An optional cover cap 26 is provided over the adjustable slide height cylinder 25 to keep the interior sump area free of dirt and water.

A sump area drain valve 27 is used to drain any drippings back to the primary tank 10. The valve is securely fastened and preferably sealed to the cover 21. Upon opening the valve the liquids are drained through drain hose 28 into the top of T-vent 29, which is in communication with vent 18 and tank 10. Contained within the drip sump area is a compression coupling 30 preferably sealed liquid tight by known methods such as a gasket and more preferably a compression gasket.

Figure 3:
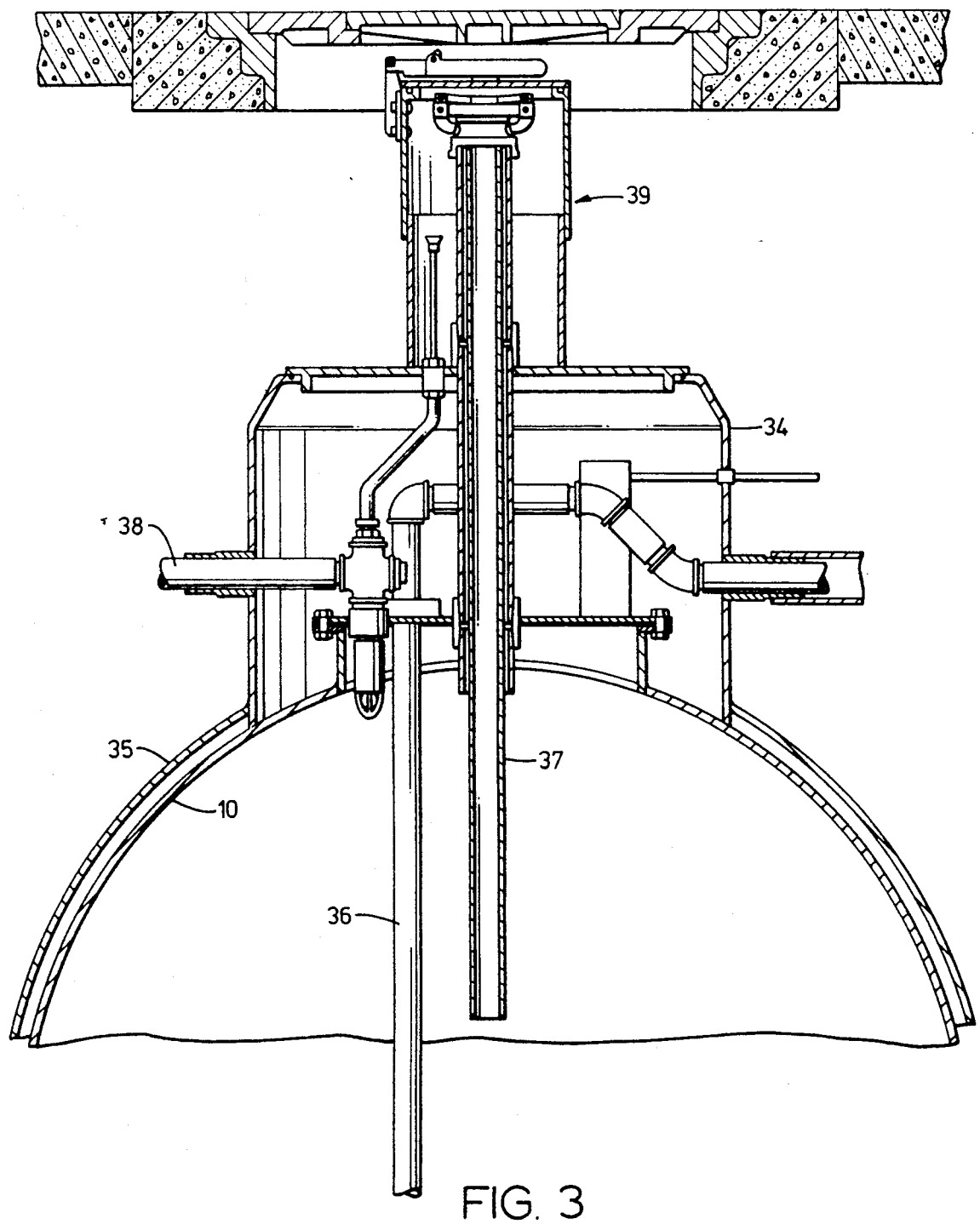
FIG. 3 is a cross-section view of another storage tank system of the invention wherein the sleeve of the system is attached to the inner storage tank.

FIG. 3 illustrates that embodiment of the invention wherein the sleeve is securely attached directly to inner tank and the jacket extends to the sleeve. The sleeve 34 is similar in shape and construction to the sleeve of FIGS. 1 and 2. However, as evident it extends to the inner storage tank 10 and is bonded thereto in a liquid tight fashion. The benefit gained is that the sleeve is structurally more stable when attached directly to the inner tank. The sleeve still isolates the area encompassed by it from the area encompassed by the jacket. Any leakage in the system is thus confined. Welding or bonding is used to attach the sleeve depending on the materials of construction of the inner tank and sleeve.

Preferably, each is made of a fibrous reinforced resinous material and additional resinous material is used for the bonding.

The jacket 35 extends to and is bonded to the sleeve 34. Its materials of construction and installation to the inner tank are the same as described above. Bonding to the sleeve is preferably done with additional resinous material. The access lines 36, 37 and 38 and drip sump compartment 39 with associated fittings of this embodiment of the invention also function the same as described above.

Leak detection means are preferably used in the closed space or spaces to monitor for leakage through either the storage tank or jacket. The closed spaces formed by the jacket and by the sleeve are independent, i.e. they are not in communication with one another. As such the closed spaces can be independently monitored.

Several different types of leak detection means can be used, including pressure change detectors, gas or liquid analyzers, and electronic probes. The detection means itself is preferably positioned within the sleeve for ready accessibility. The detection means can be periodically checked or it can be electronically connected to a remote receiving station for continuous monitoring. Pipelines leading from the closed space to the detection means are used as a means to sample the closed space for leakage. Such pipelines can extend completely to the bottom of the closed space where leaked liquid is likely to drain. These pipelines can follow the contour of the tank's outer wall or pass directly through the tank's storage area and bottom surface. Liquid tight fittings, of course, are required with the direct pipelines.

A leak detection means depicted in FIG. 1 utilizes nonatmospheric air pressure throughout the closed space. Such detection means associated with the closed space between the inner tank and jacket 11 is capable of detecting any change in pressure resulting from a leak in the jacket or inner tank. Conventional air pressure or a vacuum means 40 is used for providing a positive or negative pressure. The use of air pressure with a flexible jacket is not preferred because the jacket may be gas permeable to a certain degree and loss of pressure because of this must be compensated for. When a vacuum is used, reinforcing means are used to maintain a spaced relationship between the tank and flexible jacket. A gas pervious material, for example a continuous foraminous or porous matting is placed within the closed space between the inner tank and jacket to maintain the spaced relationship. Jute, polyurethane foam, fiberglass matting, cotton matting, nylon matting and asbestos are examples of materials which can be used. A line 41 leads from the non-atmospheric air pressure means 40 to a gauge 42 conveniently positioned, e.g. in an attendant's area for periodic checking.

Other leak detection means, e.g. a probe positioned within either or both closed space can be used. The probe is capable of detecting preselected liquids, e.g. gasoline. Various probes are known. In one type, electric wires are encased in a gasoline-soluble covering. Leaked gasoline into the closed space will eventually dissolve the covering and cause a current in the wires to short circuit.

Still another embodiment of the invention uses at least one additional flexible jacket to encase dispensing line 16. As best shown in FIG. 2, dispensing line 16 extends through the side wall of sleeve 12. Surrounding the dispensing line is a jacket 43. The jacket completely encases the dispensing line and extends from the point it enters sleeve 12 through fitting 44 to the point it connects to the ground level gasoline dispenser. Similar to the jacket 11 surrounding the storage tank, the jacket 43 contains any leakage from the dispensing line 16. If a leak does occur, it will be directed by gravity to the manhead area where it is effectively contained and detected. The material and mode of operation for the jacket encasing the inner tank applies as well to the jacket encasing the dispensing line. A separate leak detection means can be positioned in the area encompassed by the sleeve 12. Any leakage which occurs through the manhead 14 or dispensing line 16 (which is contained by jacket 43 and directed by gravity into the sleeve) will be detected and conveyed to a receiving means. Optionally, an alarm means can sound an audible or visual alarm when activated.

It should be apparent that variations of the invention described herein are possible. All such variations are within the scope of the claims.

What is claimed is:

1. A storage tank system having secondary containment means comprised of:
   (a) a rigid inner storage tank for storing liquid;
   (b) access lines for filling and dispensing liquid to and from the interior of the tank, said access lines extending through a wall of the tank to the interior thereof;
   (c) a jacket substantially encasing the inner storage tank so that a closed space exists between the inner storage tank and jacket so that any leakage which occurs through the inner storage tank will be contained by the jacket;
   (d) a sleeve attached to the jacket, said sleeve having a cover to form an enclosed sleeve area through which the access lines pass; and
   (e) a drip sump compartment positioned on the cover of the sleeve to catch drippings from a fill operation.

2. The storage tank system of claim 1 wherein the sleeve is attached to the inner storage tank by a set of brackets.

3. The storage tank system of claim 2 wherein the jacket is made of a polymeric material.

4. The storage tank system of claim 3 wherein the jacket is made of a fibrous reinforced resinous material.

5. The storage tank system of claim 4 wherein the jacket is made of a fiberglass reinforced polyester material.

6. The storage tank system of claim 1 further wherein the inner storage tank has a manhead and all the access lines extend through the manhead.

7. The storage tank system of claim 6 wherein the sleeve extends from about twelve inches to about forty-eight inches above the top of the inner storage tank.

8. The storage tank system of claim 1 wherein the drip sump compartment encompasses a fill line which leads to the interior of the inner storage tank, said compartment primarily containing drippings which occur during a fill operation.

9. The storage tank system of claim 8 further wherein a relief valve is positioned in the drip sump compartment to control flow of liquid from said compartment to a line which leads to the inner storage tank's interior.

10. The storage tank system of claim 1 further comprising a leak detection means operably associated with the closed space and the enclosed sleeve area to detect leakage.

11. The storage tank system of claim 10 further wherein a non-atmospheric pressure is maintained in the closed space and the enclosed sleeve area and a pressure change detector is used as a leak detection means.

12. The storage tank system of claim 11 further wherein a gas permeable material is positioned between the inner storage tank and jacket to maintain a spaced relationship therebetween.

13. A storage tank system having secondary containment means comprised of:
   (a) a rigid inner storage tank for storing liquid;
   (b) access lines for filling and dispensing liquid to and from the interior of the tank, said access lines extending through a wall of the tank to the interior thereof;
   (c) a sleeve securely attached to the inner storage tank, said sleeve having a cover to form an enclosed sleeve area through which the access lines pass;
   (d) a jacket substantially encasing the inner storage tank and attached to the outer wall of the sleeve so that a closed space exists between the inner storage tank and jacket so that any leakage which occurs through the inner storage tank will be contained by the jacket; and
   (e) a drip sump compartment positioned on the cover of the sleeve to catch drippings from a fill operation.

14. The storage tank system of claim 13 wherein the jacket is made of a polymeric material.

15. The storage tank system of claim 14 wherein the jacket is made of a fibrous reinforced resinous material.

16. The storage tank system of claim 15 wherein the jacket is made of a fiberglass reinforced polyester material.

17. The storage tank system of claim 13 further wherein the inner storage tank has a manhead and all the access lines extend through the manhead.

18. The storage tank system of claim 17 wherein the sleeve extends from about twelve inches to about forty-eight inches above the top of the inner storage tank.

19. The storage tank system of claim 13 wherein the drip sump compartment encompasses a fill line which leads to the interior of the inner storage tank, said compartment primarily containing drippings which occur during a fill operation.

20. The storage tank system of claim 19 further wherein a relief valve is positioned in the drip sump compartment to control flow of liquid from said compartment to a line which leads to the inner storage tank's interior.

21. The storage tank system of claim 13 further comprising a leak detection means operably associated with the closed space and the enclosed sleeve area to detect leakage.

22. The storage tank system of claim 21 further wherein a non-atmospheric pressure is maintained in the closed space and the enclosed sleeve area and a pressure change detector is used as a leak detection means.

23. The storage tank system of claim 22 further wherein a gas permeable material is positioned between the inner storage tank and jacket to maintain a spaced relationship.

* * * * *